Patented Mar. 16, 1943

2,313,738

UNITED STATES PATENT OFFICE 2,313,738

AZO DYE

Joseph B. Dickey and James G. McNally, Rochester, N. Y., assignors to Eastman Kodak Company, Rochester, N. Y., a corporation of New Jersey No Drawing. Application September 19, 1939, Serial No. 295,648

2 Claims. (Cl. 260—193)

This invention relates to new azo compounds and their application to the art of dyeing or coloring.

We have discovered that the azo compounds having the general formula:

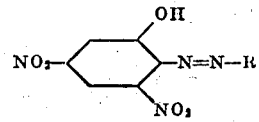

wherein R represents the residue of a member selected from the group consisting of an aryl coupling component of the benzene series, an aryl coupling component of the naphthalene series, a heterocyclic coupling component and an acetoacetarylamide coupling component and in which said aryl coupling components are joined to the azo bond shown through a nuclear carbon atom constitute a valuable class of compounds. Depending upon their structure, the azo compounds of our invention possess application for the dyeing or coloration of organic derivatives of cellulose, wool, silk, viscose and wallpaper.

Both sulfonated and non-sulfonated compounds are included within the scope of our invention. The nuclear non-sulfonated compounds, other than those in which the coupling component is an acetoacetarylamide, are particularly of value for the dyeing of organic derivatives of cellulose although they possess some application for the dyeing of wool and silk. For the dyeing of organic derivatives of cellulose, the nuclear non-sulfonated compounds, wherein R is the residue of an aryl coupling component of the benzene series, are generally advantageous. This is particularly so when R contains an N-alkyl group in para position to the azo bond. Preferably when the dye compounds of our invention are to be employed for the dyeing of organic derivatives of cellulose, they should contain no nuclear free carboxylic acid group.

The nuclear sulfonated compounds, other than those in which the coupling component is an acetoacetarylamide, possess application for the dyeing of wool and silk. These nuclear sulfonated compounds, however, have little or no utility for the dyeing of organic derivatives of cellulose. The insoluble azo dyes of our invention containing an acetoacetarylamide nucleus constitute valuable pigment dyes and can be employed, for example, for the dyeing of wallpaper. Red, yellow, orange-yellow, greenish-yellow, blue, blue-green and purple dyeings, for example, can be obtained employing the dye compounds of our invention.

It is an object of our invention to provide a new class of azo compounds. Another object of our invention is to provide dyed textile materials which are of good fastness to light and washing. Another object of our invention is to provide a process for the dyeing or coloration of organic derivatives of cellulose, wool, silk, viscose and wallpaper. A still further object of our invention is to provide a new class of nuclear non-sulfonated azo dye compounds suitable for the dyeing or coloration of cellulose acetate silk textile materials. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our inventoin will be illustrated more particuarly in connection with the coloration of cellulose acetate silk, a material to which the invention is especially adapted, it will be understood that it applies to the coloration of other organic derivatives of cellulose, such as those just named, as well as to the coloration of wool, silk, viscose and wallpaper.

The azo dye compounds of our invention can be prepared by diazotizing 1-amino-2,4-dinitro-6-hydroxybenzene and coupling the diazonium compound obtained with an aryl coupling component of the benzene or naphthalene series, a heterocyclic coupling component or an acetoacetarylamide coupling component. As previously indicated, when an aryl coupling component of the benzene or naphthalene series is employed, said coupling component is joined to the azo bond through a nuclear carbon atom.

It will be understood that alkyl as used herein, unless otherwise indicated, includes not only unsubstituted alkyl groups such as a methyl group, an ethyl group, a propyl group or a butyl group but also substituted alkyl groups such as β-hyaroxyethyl, β,γ-hydroxypropyl, β-hydroxypropyl, β-methoxyethyl or β-ethoxyethyl, for example.

The following examples illustrate the preparation of the azo compounds of our invention:

EXAMPLE 1

A. 20 grams of 1-amino-2,4-dinitro-6-hydroxybenzene are dissolved in 225 cc. of hot glacial acetic acid and the resulting solution is then cooled rapidly to room temperature.

B. 7.6 grams of sodium nitrite are dissolved in 55 grams of 100% sulfuric acid at 15° C. and the resulting solution is warmed to 70° C. following which it is cooled to 15-20° C.

The mixture prepared in B is added to the mixture prepared in A over a period of 30.45 minutes while stirring and maintaining a temperature of 15-20° C. Stirring is continued at room temperature for several hours and then 1 gram of urea is added to remove any excess nitrous acid.

12.8 parts of barbituric acid are dissolved in 200 parts of water to which has been added 31 parts of sodium carbonate and the resulting solution is cooled to a temperature approximating 0-10° C. by the addition of ice, for example. The diazo solution prepared as described above is then added with stirring and concurrently with its addition an aqueous solution of sodium hydroxide is added in sufficient amount to maintain the reaction mixture slightly alkaline. A temperature of 0-10° C. is maintained throughout the reaction which takes place. Upon completion of the coupling reaction, the mixture is made acid to litmus by the addition of acetic acid and the dye compound formed is recovered by filtration, washed with water and dried. The dye compound obtained colors cellulose acetate silk, wool and silk a greenish-yellow color.

Similarly, by the substitution of an equivalent gram molecular weight of acetoacetanilide, o-chloroacetoacetanilide and p-β-hydroxyethoxyacetoacetanilide for the barbituric acid of the above example, pigment dyes included within the scope of our invention can be obtained.

Example 2

18.1 grams of di-β-hydroxyethylaniline are dissolved in glacial acetic acid and the resulting solution is cooled to a temperature approximating 0-10° C. The diazo solution prepared as described in Example 1 is then added with stirring, while maintaining a temperature of 0-10° C. Upon complete addition of the diazo solution, the mixture is permitted to stand for awhile after which it is made neutral to Congo red paper by the addition of sodium acetate. Water is then added to the mixture and the precipitated dye compound formed is recovered by filtration, washed with water and dried. The dye compound obtained colors cellulose acetate silk a rubine shade.

Example 3

29 grams of butyl sodium-β-sulfoethyl-m-toluidine are dissolved in glacial acetic acid and coupled with 20 grams of diazotized 1-amino-2,4-dinitro-6-hydroxybenzene. Coupling and recovery of the dye compound may be carried out as described in Example 2. The dye compound obtained colors cellulose acetate silk a violet shade.

Example 4

.1 gram mole of

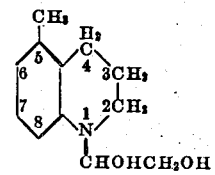

is dissolved in glacial acetic acid and the resulting solution is cooled to a temperature approximating 0-10° C. The diazo solution prepared as described in Example 1 is then added with stirring while maintaining a temperature of 0.10° C. The coupling reaction which takes place is completed by adding sodium carbonate until the mixture is neutral to Congo red paper. The dye compound formed is recovered by filtration, washed with water and dried. The dye compound obtained colors cellulose acetate silk a blue shade.

The following tabulations further illustrate the compounds included within the scope of our invention. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 4, inclusive.

Table A

| Amine | Coupling component | Color on cellulose acetate silk, wool and silk |
|---|---|---|
| 1-amino-2,4-dinitro-6-hydroxybenzene | 2,4-dihydroxyquinoline | Greenish-yellow. |
| Do | 2,4-dihydroxypyridine | Do. |
| Do | 3-methyl-5-pyrazolone | Yellow. |
| Do | 1-phenyl-3-methyl-5-pyrazolone | Orange-yellow. |
| Do | O-Methoxyacetoacetanilide | Yellow. |
| Do | p-Cresol | Do. |
| Do | Di-γ-hydroxypropyl-m-toluidine | Purple. |
| Do | Glyceryl cresidine | Do. |
| Do | Ethyl glyceryl cresidine | Violet. |
| Do | Ethyl-γ-chloro-β-hydroxy-propyl cresidine | Do. |
| Do | Amyl sodium β-sulfatoethyl-cresidine | Do. |
| Do | β-Hydroxypropylaniline | Rubine. |
| Do | Ethylaniline | Do. |
| Do | Diethylaniline | Violet. |
| Do | Ethyl-β-hydroxyethyl-2,5-dimethoxyaniline | Violet-purple. |
| Do | Glyceryl-2,5-diethoxyaniline | Reddish-blue. |
| Do | Glyceryl-α-naphthylamine | Blue. |
| Do | β-Hydroxyethyl-α-naphthylamine | Do. |
| Do | Glyceryl butyl-m-toluidine | Purple. |
| Do | 1-methoxy-2-ethylglyceryl-amino-4-acetaminobenzene | Blue-green. |
| Do | [structure shown] | Blue. |

Table A—Continued

| Amine | Coupling component | Color on cellulose acetate silk, wool and silk |
|---|---|---|
| 1-amino-2,4-dinitro-6-hydroxybenzene | Glyceryl-2,5-dimethyl-benzomorpholene | Blue. |
| Do | Glyceryl-7-acetamino-benzomorpholene | Do. |
| Do | Glyceryl-5-acetamino-benzomorpholene | Do. |
| Do | Ethyl-5-ethylbenzomorpholene | Do. |
| Do | β-Hydroxyethyl-5-chloro-benzomorpholene | Do. |
| Do | Glyceryl-7-methyltetrahydroquinoline | Do. |
| Do | Ethyl-5-methyltetrahydroquinoline | Do. |
| Do | Tetrahydroquinoline benzotetronic acid | Greenish-yellow. |
| Do | Di-β-hydroxyethyl-m-chloroaniline | Red. |
| Do | m-Toluidine | Do. |
| Do | β-Hydroxyethyl-γ-hydroxypropyl cresidine | Violet. |
| Do | 1-β-hydroxyethylamino-5-naphthol | Blue-green. |
| Do | γ-Hydroxypropylaniline | Rubine. |
| Do | Glyceryl-5-acetamino-tetrahydroquinoline | Blue. |
| Do | Glyceryl-7-acetamino-tetrahydroquinoline | Do. |
| Do | β-Hydroxyethyl-2-hydroxytetrahydroquinoline | Do. |
| Do | 4-iminobarbituric acid | Yellow. |
| Do | Thiobarbituric acid | Do. |
| Do | 2-imino-3-cyanobarbituric acid | Do. |
| Do | 4-methylthiobarbituric acid | Do. |

Table B

| Amine | Coupling component | Color on wool, silk, and viscose |
|---|---|---|
| 1-amino-2,4-dinitro-6-hydroxybenzene | 2-naphthol-5-sulfonic acid | Red. |
| Do | 1-amino-5-naphthol-8-sulfonic acid | Blue-green. |
| Do | 1-sulfophenyl-3-methyl-5-pyrazolone | Greenish-yellow. |

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of our invention.

In order that our invention may be clearly understood, it is here noted that 1-amino-2,4-dinitro-6-hydroxybenzene can be prepared as described in the Journal of the Chemical Society, page 2345 (1931), part II.

Both water soluble and water insoluble azo dye compounds are included within the scope of our invention. Those compounds, other than those in which the coupling component is an acetoacetarylamide, which are insoluble in water, may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. For a more complete description as to how these water insoluble azo dye compounds of our invention can be employed for the dyeing of organic derivatives of cellulose, reference may be had to our United States Letters Patent No. 2,115,030, issued April 26, 1938. These water insoluble azo dye compounds of our invention as previously noted also possess application for the dyeing of wool and silk and they may be applied to these materials in the same manner as they are applied to organic derivatives of cellulose.

The water soluble dye compounds of our invention, other than those in which the coupling component is an acetoacetarylamide, may be applied to wool, silk, cotton, regenerated cellulose and (depending upon the nature and position of the water solubilizing group) organic derivatives of cellulose textile materials from an aqueous solution of the dye which may contain salt. These water soluble dye compounds can be applied to the fiber in substantially the same manner as the water insoluble dye compounds. In the case of the water soluble dye compounds, however, the use of a dispersing or solubilizing agent is not necessary. It will be understood, of course, that the above remarks concerning the application of the dye compounds of our invention to textile materials are merely illustrative and that any of the customary methods for applying dyes of the character here involved can be employed.

The azo dye compounds of our invention which contain an acetoacetarylamide nucleus constitute pigment dyes and can be employed for the uses to which pigment dyes are ordinarily put by the usual methods of application known to the art.

We claim:

1. The azo dye compounds having the general formula:

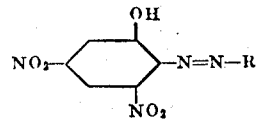

wherein R represents the residue of an acetoacetarylamide coupling component.

2. The azo dye compounds having the general formula:

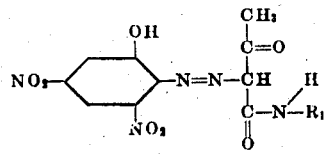

wherein $R_1$ represents the residue of an aryl nucleus of the benzene series containing but one benzene ring.

JAMES G. McNALLY.
JOSEPH B. DICKEY.